United States Patent [19]

Joyce et al.

[11] 4,124,893

[45] Nov. 7, 1978

[54] MICROWORD ADDRESS BRANCHING BIT ARRANGEMENT

[75] Inventors: Thomas F. Joyce, Burlington; Michel M. Raguin, Medford, both of Mass.

[73] Assignee: Honeywell Information Systems Inc., Waltham, Mass.

[21] Appl. No.: 733,558

[22] Filed: Oct. 18, 1976

[51] Int. Cl.² ............... G06F 9/12; G06F 9/20; G06F 13/00
[52] U.S. Cl. ............................................. 364/200
[58] Field of Search ............... 340/172.5; 445/1; 364/200 MS File, 400 MS File

[56] References Cited

U.S. PATENT DOCUMENTS

| | | | |
|---|---|---|---|
| 3,292,155 | 12/1966 | Neilson | 364/200 |
| 3,325,785 | 6/1967 | Stevens | 340/172.5 |
| 3,344,404 | 9/1967 | Curewitz | 340/172.5 |
| 3,454,931 | 7/1969 | Bahrs et al. | 364/200 |
| 3,560,933 | 2/1971 | Schwartz | 340/172.5 |
| 3,571,804 | 3/1971 | Hemdal et al. | 364/200 |
| 3,634,883 | 1/1972 | Kreidermacher | 364/200 |
| 3,659,275 | 4/1972 | Marshall | 340/172.5 X |
| 3,676,851 | 7/1972 | Eastman | 364/200 |
| 3,707,703 | 12/1972 | Sakai | 364/200 |
| 3,708,786 | 1/1973 | Hardin et al. | 364/200 |
| 3,728,686 | 4/1973 | Weisbecker | 340/172.5 |
| 3,731,285 | 5/1973 | Bell | 340/172.5 |
| 3,736,567 | 5/1973 | Lotan et al. | 340/172.5 |
| 3,737,867 | 6/1973 | Cavin et al. | 340/172.5 |
| 3,751,637 | 8/1973 | Dillon et al. | 364/200 X |
| 3,753,242 | 8/1973 | Townsend | 340/172.5 |
| 3,872,447 | 3/1975 | Tessera et al. | 364/200 |
| 3,956,738 | 5/1976 | Tessera | 340/172.5 |
| 3,958,227 | 5/1976 | Evans | 364/200 |

Primary Examiner—Melvin B. Chapnick
Attorney, Agent, or Firm—Ronald T. Reiling; Nicholas Prasinos; George Grayson

[57] ABSTRACT

A digital computing system includes an addressable read only memory for storing microprogram control words. A plurality of the microprogram control words each include a predetermined bit used for branching. When the predetermined bit within a control word is not set, the next microprogram control word is read from the next microprogram memory address. When the predetermined bit is set, the next microprogram word is read from the microprogram memory address having a value which corresponds to the next address plus a weighted value of the predetermined bit.

5 Claims, 5 Drawing Figures

| BIT POS. | 0 | 2 3 | 4 | 10 11 | 17 18 | 21 | 23 25 | 35 |
|---|---|---|---|---|---|---|---|---|
| BCL | | S | REGISTER FILE A | B | ARITH TYPE | FUNCT | B SEL | D | IC | BUS COMM. |

FIG. 3A

| LER | | S | REGISTER FILE A | B | ARITH TYPE | FUNCT | B SEL | D | EXT. REG. CONTROL REG. | CONST. |
|---|---|---|---|---|---|---|---|---|---|---|

FIG. 3B

| ULB | | S | REGISTER FILE A | B | ARITH TYPE | FUNCT | B SEL | D | IC | BRANCH ADDRESS |
|---|---|---|---|---|---|---|---|---|---|---|

MICROWORD ADDRESS BRANCHING BIT ARRANGEMENT

RELATED APPLICATIONS

The following application is incorporated by reference into the instant application.

1. "Microprogram Splatter Return Apparatus", invented by Thomas F. Joyce and Michel M. Raguin, filed on Oct. 4, 1976 and having U.S. Ser. No. 729,065 and assigned to the same assignee as the instant invention.

BACKGROUND OF THE INVENTION

1. Field of the Invention

This invention relates to data processing systems and more particularly to an improved microprogram control unit.

2. Description of the Prior Art

In the early 1950's, M. V. Wilkes delivered at the Manchester University Computer Inaugural Conference, July, 1951, a paper entitled "The Best Way to Design an Automatic Calculating Machine", in which he proposed a computer which would have a variable-instruction set. The paper was published in the Conference Journal on pages 16–18. Normally a fixed set of instructions is available to the programmer, each one composed of a succession of elementary operations or micro-operations. The implementation of micro-operations constitutes the design of the variable-instruction machine. For each instruction, the micro-operation sequence ($\mu$-op) is usually fixed in computer hardware design. What Wilkes proposed was a means by which a programmer could assemble $\mu$-ops into any instruction the computer was inherently capable of executing. With microprogramming, a machine's instruction repertoire could be altered from day-to-day as its applications vary.

As a means for implementing a variable-instruction repertoire, the need for a memory to store the $\mu$-op sequences was postulated, and Wilkes proposed the use of a diode matrix. In today's technology, we refer to this device as a read-only memory (ROM) or non-destructive read-out memory. The latter term is more appropriate since the variable instruction repertoire presupposes the ability to change the memory's contents; however, the former term is in common usage, so we will use it here. In any event, we are referring to a memory which can be altered by a microprogrammer, but (usually) not by the machine, (i.e. the microwords are permanently recorded in the ROM by having each bit "burned in" by a shorting technique which connects ROM elements in a way desired by the microprogrammer).

The device that performs the $\mu$-op sequencing in a computer is usually referred to as the control element. In talking about the ROM control elements, we will be referring to a plurality of rectangular memory arrays with a specific number of words in each rectangular memory, each word consisting of a predetermined number of bits. All bits of a word are read out together, and they cumulatively specify a set of $\mu$-ops to be executed either simultaneously or sequentially as specified by an external clock. Thereafter, another word is read out and executed in similar fashion and so on. Each word specifies a set of $\mu$-ops; and a sequence of words specifies a sequence of sets of $\mu$-ops. A set of words whose $\mu$-ops define (or execute) some specified function is called a microprogram. In today's technology, a variety of devices are being used to create a ROM control element; however, semi-conductor devices are fast replacing all other types.

In its most simple usage, each bit of a microword is used to generate one $\mu$-op; hence, a bit position in the word will contain a one as the corresponding $\mu$-op is desired in that word, otherwise it will be zero. These microwords are stored in the read-only memory (ROM). An instruction read out of main memory initiates the first of a series of microwords to be read out of the ROM to cause the CPU of the computer system to execute the instruction read out from main memory.

These techniques are well known and described fully in a book entitled "Microprogramming: Principles and Practices," by Samir S. Husson, published in 1970 by Prentice-Hall Inc., of Englewood Cliffs, New Jersey. Additionally, several patents have issued on various features of microprogramming including a U.S. Pat. No. 3,736,567 issued on May 29, 1973 which features a technique wherein a predetermined bit in the last microword of a microprogram initiates a new program memory cycle and a new microprogram memory cycle.

Read only memories are in extensive use today in most computer systems, some typical ones being the Honeywell Model 4200/8200, the Honeywell Series 60, the IBM 360 Series and the IBM 370 Series.

More recently, the ROM has been incorporated into minicomputers for controlling the execution of instructions. However, the minicomputer business is very competitive in terms of price and performance. Two primary demands compatible with the lowest cost have surfaced on the marketplace. One is to provide a greater "throughput capability," while another is to provide broader capability for providing a broader spectrum of services to the user. These requirements translate into one broad general requirement — maximum data handling capability with minimum hardware requirements. Accordingly, the computer designer is faced with the problem of reducing the ultimate cost of the computer system while at the same time increasing capabilities of the computer system. These requirements act in opposition to each other. Generally, additional features and capabilities require increased hardware which translates to increased cost; whereas reducing costs translates to a reduced number of features and capabilities by reducing hardware.

Although ROM's have been introduced into minicomputers for controlling the execution of instructions through the use of microprogramming and microinstructions, efforts are continuing in order to provide a more efficient ROM for executing instructions by conserving read only memory or steps in the execution of an instruction. Prior art ROM's use a branch microinstruction in order to jump to different locations in main memory. Each branch order takes one complete ROM cycle or 200 nanoseconds to change a ROM address. What is needed in order to make use of a fragmented space in a ROM and in order to save steps in some microinstructions, is a means of branching to a different location without the use of a branch order thus saving at least 200 nanoseconds per branch, and utilizing empty space in a ROM.

OBJECTS OF THE INVENTION

It is a primary object of the invention therefore to provide a means for ensuring maximum data handling capabilities at minimum cost.

It is another primary object of the invention to provide an improved ROM system.

It is still a further object of the invention to provide a ROM system that eliminates the need for a branch order in changing ROM locations.

It is yet another object of the invention to provide apparatus responsive to a predetermined bit position of a microword of a ROM for branching to different locations in ROM.

It is still a further object of the invention to provide apparatus responsive to a predetermined bit position of a microword in a microprogramming sequence for advancing a ROM address by 128 positions for reading the next address.

SUMMARY OF THE INVENTION

In accordance with the above and other objects of the invention, ROM space is conserved and throughput is increased by making use of a "dual bit" in a predetermined position of a microword which permits a microprogram to continue its executing utilizing microinstructions stored in one contiguous block of ROM space, or alternately at two or more discontinuous blocks of ROM space, without penalizing throughput or speed. Generally, microprograms are written to perform a predetermined function i.e. execute a macroinstruction, handle an interrupt, etc. As such, they may not fit neatly into one block of available space in ROM, and several blocks of ROM space varying in size may be utilized. Conventional methods require a branch order which consumes at least one ROM cycle or typically 200 nanoseconds.

The dual bit is utilized with apparatus responsive to it so that when the "dual bit" is set to zero the microprogram executes in one contiguous block of ROM space. However, when the dual bit is set to one, the address of the microprogram is advanced by a predetermined number of positions, such as 128 positions although any other number may be utilized; hence, an empty space in a ROM can be utilized for storing a portion of a microprogram, and the remainder can be stored in another empty space physically separated from the first empty space. This is done without penalizing speed or throughput by eliminating a conventional branch order which requires at least a ROM cycle for execution.

BRIEF DESCRIPTION OF THE DRAWINGS

FIGS. 3a-3c are formats of different types of microinstructions utilized by the invention.

DESCRIPTION OF THE PREFERRED EMBODIMENT OF THE INVENTION

General

Figure 1:
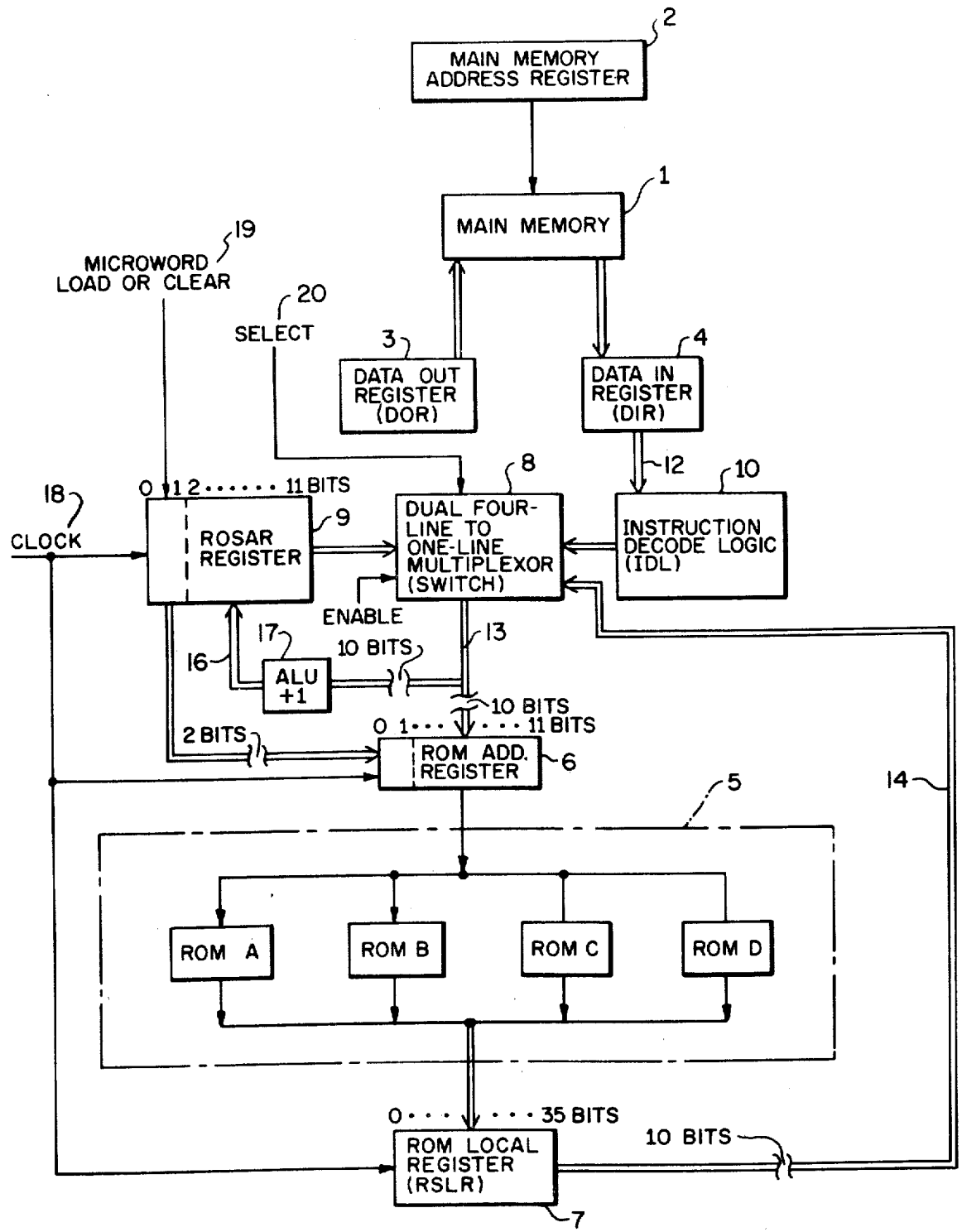
FIG. 1 is a block diagram of the pertinent parts of a prior art main memory (MM) subsystem and a read-only (ROM) subsystem.

In order to best understand the differences between the features of the claimed invention and the prior art, the prior art will be discussed in greater detail in conjunction with FIG. 1. Referring now to FIG. 1, there is shown a conventional solid state random access main memory 1 which stores instructions and data. Main memory address register 2, stores the address of the location in memory that receives information from data out register (DOR) 3, when the op-code of the instruction requests a write operation into main memory; it also stores the address of the location in main memory 1 that provides information to data in register (DIR) 4 when the op-code of the instruction calls for a read operation. (DIR) 4 stores signals representing an instruction to be executed under control of the ROM system and transmit the information to the instruction decode logic unit 10 via path 12. The instruction is decoded in instruction decode logic unit 10, and 10 bits representing a ROM address are selected by switch 8 and transferred to ROM address register 6 providing the address of the ROM 5. Switch 8 is a dual 4 line to 1 line multiplexor of the SN74153 type which is described on pages 9–351 through pages 9–364 of the Integrated Circuits Catalog for Design Engineers, published by Texas Instruments Inc. Microwords are stored in read only memory (ROM) 5 which is comprised of 4 banks of memory ROM A through ROM D, each bank comprised of 1,024 words, each word comprising 36 bits plus 4 additional parity bits. (It should be noted that the ROM memory system is a typical memory system and other types of ROM's with different size words may also be utilized to practice the invention). Each microword in ROM 5 is addressed by a 12 bit ROM address register 6. The first 2 bits of ROM register 6 provide the address of the bank of ROM 5 whereas the 10 bits 2–11 provide the address within a particular bank. A microword addressed by ROM address register 6 is read into ROM local register (RSLR) 7. A microword in (RSLR) 7 is made up of various control bits which are sent to different subsystems where specific control functions are performed depending upon the bit configurations. These control functions other than the "dual bit" which is the predetermined bit in bit position 22 are not described further in this application since they are not pertinent to the invention. However, to gather the flavor of the various type of control bits that perform various control functions that are read into (RSLR) 7, FIGS. 3a–3c are provided. These formats are typical and there may be other 36 bit formats in a conventional microword for the ROM. What is not typical in these formats is the dual bit in bit position 22 of FIGS. 3a and 3b and is denoted the "dual bit".

Concurrently, with the reading of the 10 bits of an instruction indicating the address of the first word in the ROM 5 of the microprogram to be executed, these 10 bits are also read into ROSAR register 9 after it has been incremented in the arithmetic and logic unit (ALU) 17 by 1; thus, ROSAR register 9 holds the address of the next microinstruction of the microprogram sequence to be executed. The ROSAR register 9 is a 12-bit register. Bits 0 and 1 of ROSAR register 9 are loaded or cleared under microword load or clear signal 19. Bits 2 through 11 of ROSAR register 9 are loaded via path 16 as described below. The microword load or clear signal 19 is not pertinent to the invention and hence is not described further herein. When the microinstruction is read into (RSLR) 7 under control of ROM address register 6, it will be executed by the microprogram control unit (not shown) unless it is a branch instruction similar to that of FIG. 3c, whereupon the last 10 bits of the branch instruction are transferred to ROM address register 6 via path 14 and switch 8. The last 10 bits represent the new branch address and accordingly the execution microprogram begins at the new address provided.

Additionally, the 10 branch bits representing the address of the first instruction in the microprogram to be executed are stored in ROSAR register 9 after once again having been incremented by 1 in ALU 17. On successive cycles which typically occur every 200 nanoseconds, the ROSAR register 9 sends 10 bits through switch 8 to ROM address register 6, and in the process ROSAR register 9 is incremented by 1 by ALU 17 over paths 13, and 16. Hence, it is seen that after the address of the first microinstruction is provided via ROM address register 6, the address of succeeding microinstructions is provided via ROSAR register 9 every 200 nanoseconds under control of clock 18 and thus the microprogram is executed until a microword in the executing microprogram causes a select signal 20 to connect another address source through switch 8.

With this conventional ROM system which does not include the "dual bit" apparatus if a microprogram does not fit into a given space in the ROM and several spaces in the ROM are necessary, continuity in execution is obtained by using a microinstruction of the type shown on FIG. 3c. Hence, bits 25–35 provide the branch order to go to another noncontiguous address.

However, if a microinstruction of the type shown on FIGS. 3a or 3b are executing, an additional microinstruction of the type shown on FIG. 3c having the branch address is required. This as previously described, requires one additional ROM cycle and additional space for the microprogram to store the instruction of the type shown on FIG. 3c. If several such branches are necessary, the throughput of the computer and speed are severely penalized.

Operation and Structure of the Invention

The minicomputer system utilizing the invention has 6 different types of microwords, the format of 3 typical ones being shown on FIGS. 3a–3c. The microword, their identification and function are listed in Table I below.

TABLE I

| Code | Mnemonic | Function | Dual Bit |
|------|----------|----------|----------|
| 0 | BCL | Interface Control | D |
| 1 | ULB | Long Branch | — |
| 4 | LER | General Register Control | D |
| 5 | SBR | Short Conditional Branch | — |
| 6 | SPL | Splatter | — |
| 7 | GCN | Constant Generator | — |

Figure 2:
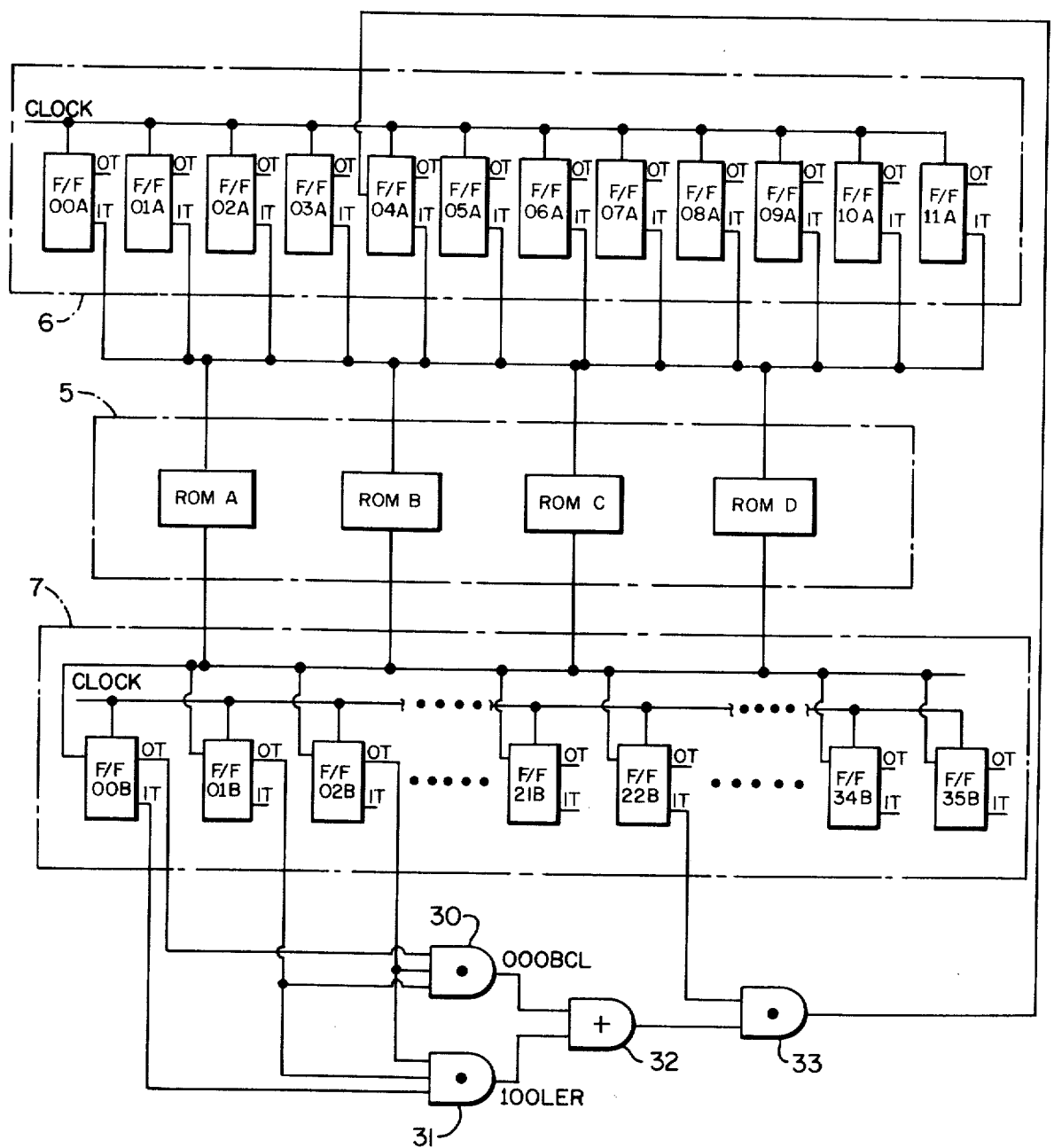
FIG. 2 is a logic block diagram of the invention.

Microwords ULB, SBR and SPL have a next address location of the next microword as typically shown by the ULB type microword of FIG. 3c labelled Branch Address 50. The BCL and LER types of microwords shown on FIG. 3a and FIG. 3b have not identified the next address and accordingly the microword of the type typically shown on FIG. 3c would have to be utilized which would add an additional ROM cycle. However, this is eliminated by the invention shown on FIG. 2. The invention of FIG. 2 is responsive to bit 22 of the BCL and LER type microwords shown on FIG. 3a and FIG. 3b to increment the address of the microprogram by a predetermined amount, e.g. 128 positions although any other number may be utilized. The microprogram then continues its execution at the new branch address.

Referring now to FIG. 2, a portion of the prior art apparatus of FIG. 1 is shown in combination with the invention. Those elements of FIG. 2 which are the same as in FIG. 1 are numbered the same. Hence, the ROM address register 6 of FIG. 1 is the same as the ROM address register 6 on FIG. 2; however, it will be seen that flip-flop F/F04A has its set terminal coupled to the output of AND gate 33. AND gate 33 is enabled when both its input terminals are high. Both of the input terminals of AND gate 33 will be high when there is either a BCL or LER type instruction being executed and when the 1 terminal of flip-flop F/F22B is high. The 1 terminal of F/F22B is coupled as one input terminal of AND gate 33. The other input terminal of AND gate 33 is coupled to the output terminal of OR gate 32. One input terminal of OR gate 32 is coupled to the output terminal of AND gate 30, whereas the other input terminal of OR gate 32 is coupled to the output terminal of AND gate 31. AND gate 30 is enabled when a BCL type instruction shown on FIG. 3a is executing whereas AND gate 31 is enabled when an LER type instruction shown on FIG. 3b is executing. It should be noted from the discussion supra, that the address code of BCL type instruction is 000 which occupies the first 3 bits of the format. The first 3 flip-flops F/F00B-F/F02B of ROM local register (RSLR) store the code of the microword for execution. Hence, when the 0 terminal of flip-flops F/F00B, F/F01B, and F/F02B are set or high, then it will be seen by following the outputs of each of those 0 terminals that AND gate 30 is enabled signifying that the BCL type microinstruction is executing. Similarly, it will be seen that AND gate 31 is enabled when a binary 4 code (1 0 0) are present at the input terminals of AND gate 31. A binary 1 0 0 signal is present at the input terminals of AND gate 31 when the 1 terminal of flip-flop F/F00B is high and the 0 terminals of flip-flop F/F01B and F/F02B are high. With either AND gate 30 or 31 high OR gate 32 is enabled and applies one high input signal to AND gate 33. If the microprogram is to continue without any branch, the 1 terminal of flip-flop F/F22B is low and accordingly, AND gate 33 is not enabled and no address change is applied to ROM address register 6 via the setting of flip-flop F/F04A. However, if for some reason, the microprogrammer did not have space to completely store the microprogram in one block of the ROM, he would want to utilize some other area of the ROM which is free. This he does by setting bit 22 of either microinstruction BCL or LER high. This bit when set high sets flip-flop F/F22B causing the 1 terminal to go high. With the 1 terminal of flip-flop F/F22B high, another input terminal of AND gate 33 is high and thus enables AND gate 33 and provides a high set signal for flip-flop F/F04A which causes the 1 terminal of that flip-flop to go high. When this F/F04A flip-flop goes high, it automatically adds 128 binary to whatever address is in ROM address register 6. This is so because each flip-flop of ROM address register 6 has a binary weight. For example, the binary weight of flip-flop F/F11A is one; then progressing towards the left, the next flip-flop F/F10A has a binary weight of 2 whereas the next leftmost position has a binary weight of 4 and so on until flip-flop F/F04A is reached which has a binary weight of 128. By causing this flip-flop to go high, 128 is automatically added to any address in ROM address register 6.

Referring to FIG. 3a through FIG. 3c, the pertinent portions of those formats of the microinstructions as they pertain to the invention have been described. It is not necessary for a person of ordinary skill in the art, in order to practice the invention, to know what each field in the different bit position controls other than the code field of bits 0–2 and the D field at bit position 22 already described. As a matter of fact, the other bit positions may be grouped in any manner that is consistent with the operation of a conventional microprogram unit.

What is claimed is:

1. A data processing system comprising:

at least one read only memory (ROM) for storing a plurality of microprograms, coupled to a ROM address register storing bits representative of a ROM address location, each microprogram comprising a plurality of microwords, said plurality of microwords comprising a first group of microwords and a second group of microwords, each microword of said first group having a plurality of coded bits designating a branch address for storing in said ROM address register, and said second group having at least two microwords each having a bit in a predetermined bit position for incrementing by a predetermined amount said ROM address register when said bit in said predetermined position is a binary ONE and a particular bit position in said ROM address register is a ZERO by said binary ONE, replacing said ZERO;

a ROM local register (RSLR) coupled to said ROM for storing one of said plurality of microwords from said ROM address location during a first cycle of operation;

said RSLR further coupled to said ROM address register for storing said branch address in said ROM address register during a second cycle of operation when one of said plurality of microwords of said first group is stored in said RSLR;

decoding means coupled to said RSLR and responsive to a plurality of bits stored in said RSLR for detecting said one of at least two microwords of said second group when one of said plurality of microwords of said second group is stored in said RSLR; and ANDing means coupled to said decoding means, said RSLR and said ROM address register, being responsive to said binary ONE bit stored in said predetermined position of said RSLR, and being further responsive to said decoding means detecting said one of at least two microwords of said second group and incrementing said ROM address register by said predetermined amount during said second cycle of operation when said particular bit position in said ROM address register contains said ZERO by replacing said ZERO by said binary ONE.

2. The data processing system as recited in claim 1 wherein said decoding means is comprised of a plurality of first AND gates and an OR gate, said first AND gates having their output terminals coupled to the input terminals of said OR gate.

3. The data processing system as recited in claim 2 wherein said ANDing means is comprised of second AND gate means having at least two input terminals with one of its input terminals coupled to the output terminal of said OR gate, and the second of its input terminals coupled to said RSLR.

4. The data processing system as recited in claim 3 wherein said RSLR is comprised of a plurality of flip-flops, each flip-flop having a "zero" output terminal and a "one" output terminal and wherein the second input terminal of said second AND gate means is coupled to the "one" terminal of a predetermined one of said plurality of flip-flops.

5. The data processing system as recited in claim 4 wherein said plurality of first AND gates is comprised of AND gate one and AND gate two and wherein all the input terminals of AND gate one are coupled to the "zero" terminal of the first three flip-flops of said RSLR, and all but one of the input terminals of AND gate two are coupled to the "zero" terminal of the first three flip-flops with the remaining input terminal of AND gate two being coupled to the "one" output terminal of the first flip-flop of said RSLR.

* * * * *